United States Patent [19]

Gandini et al.

[11] Patent Number: 5,260,378
[45] Date of Patent: Nov. 9, 1993

[54] CATIONIC BLOCK POLYMER ON THE BASIS OF A FURAN DERIVATIVE

[75] Inventors: Alessandro Gandini, St. Martin; Marie C. Salon, Grenoble, both of France

[73] Assignee: Stamicarbon B.V., Geleen, Netherlands

[21] Appl. No.: 466,914

[22] Filed: Jan. 18, 1990

[30] Foreign Application Priority Data

Jan. 20, 1989 [NL] Netherlands .................... 8900137

[51] Int. Cl.$^5$ ................. C08F 269/00; C08L 67/00; C08L 77/00; C08L 77/12
[52] U.S. Cl. ...................... 525/156; 525/175; 525/176; 525/182; 525/275; 525/284; 525/400; 525/401; 525/421; 525/445; 525/447; 525/452; 525/529; 525/918
[58] Field of Search ............... 525/181, 182, 184, 178, 525/175, 176, 177, 156, 164, 202, 284, 206, 275, 421, 425, 424, 426, 400, 401, 445, 447, 452, 528, 529, 455

[56] References Cited

U.S. PATENT DOCUMENTS 3,887,643  6/1975  Selman .................... 525/184
3,994,993  11/1976  Kennedy et al. ............ 525/249
4,228,253  6/1979  Marie et al. .............. 525/247
4,287,093  4/1980  Gilbert et al. ............ 252/429 B
4,845,158  7/1989  Peters .................... 525/354

FOREIGN PATENT DOCUMENTS 0161021  11/1985  European Pat. Off. .

Primary Examiner—Ana L. Carrillo
Attorney, Agent, or Firm—Cushman, Darby & Cushman

[57] ABSTRACT

The invention relates to a block copolymer according to the general formula A-b-B on the basis of a furan derivative as binding group (b) and the process for the preparation hereof. The furan derivative as binding group (b) is a compound according to formula (I).

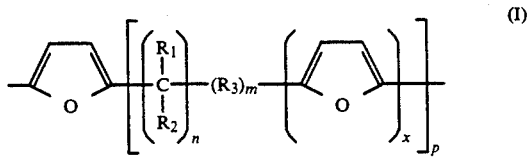

The block copolymer can simply be prepared in one single reactor and is suitable for use as compatibilizer.

12 Claims, No Drawings

CATIONIC BLOCK POLYMER ON THE BASIS OF A FURAN DERIVATIVE

The invention relates to a block copolymer according to the general formula A-b-B, prepared by cationic polymerization of at least one polymer chain to a binding group (b).

Such a block copolymer is known from U.S. Pat. No. 3,994,993, which discloses block copolymers in which the binding group (b) is a compound derived from formula (X),

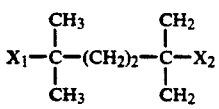

where $X_1$, $X_2$ preferably is a chlorine and a bromine atom, respectively. The above compound is synthesized at a very low temperature ($-78°$ C.). The cationic reaction of the compound according to formula (X) with, for instance, polyisobutylene and polystyrene subsequently takes place at $-65°$ C. to $-45°$ C.

These low temperatures have given rise to the need for block copolymers, of the A-b-B type, with a binding group (b) that can prepared in a simple manner and at higher temperatures, the binding group (b) containing one or more reactive groups.

This object is achieved in that the block copolymer according to the invention contains a furan derivative according to formula (I) as binding group (b):

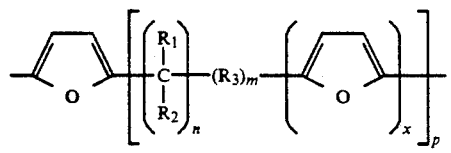

where:

$n = 0–10$;

$m = 0$ or $1$;

$X, P = 0, 1$ or $2$;

$R_1$, $R_2 =$ a hydrogen and/or an alkyl group with 1–4 C atoms;

$R_3 = $ —NCO— or —COO—.

It has, surprisingly, been found that block copolymers according to the invention with a binding group (b) according to formula I are eminently suitable for use as compatibilizer for, especially, thermoplastic mixtures. It has also been found that the synthesis of the block copolymer may simply take place in one single reactor at relative increased temperature.

By preference the block copolymer according to the invention contains a furan derivative according to formula (III) or formula (IV).

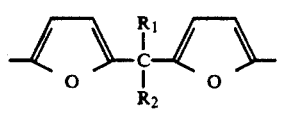

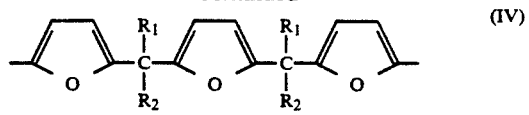

where $R_1$ and $R_2$ is a hydrogen or a methyl group.

The furan derivatives in the block copolymer according to the invention can be prepared in a simple manner from furan, furfuryl alcohol and/or 2 furyl methane. Said substances are commercially available. The synthesis and technology of furan compounds is described in, for instance, "Furan derivatives", W. J. Mckillip and E. Sherman, Kirk-Othmer, Encyclopedia of Chemical Technology, vol. 11, John Wiley & Sons, Inc., New York, 1981, pp. 499–527.

The block copolymer according to the invention contains two polymer chains, A and B, with at least one polymer chain being bound to the furan derivative by means of cationic polymerization. It is possible to bind both polymer chains, A and B, to the furan derivative in a cationic manner. Likewise, a combination of cationic and anionic polymerization is suitable.

Polymer chains that, for instance, are suitable for use in the block copolymer according to the invention are the vinyl-containing polymers, for instance polyisobutylene, polyiso-propylene and other polydiens, polystyrenes and derivatives thereof, polyvinyl carbazoles, polyvinyl ethers, polyvinyl furans, polyesters, polyethers, polyacetals, cyclic siloxanes, cyclic sulphides and cyclic amines.

Examples are chains of polytetrahydrofuran, poly-δ-caprolactam, polydioxolane, (poly)oxazoline and (poly)aziridine, or combinations of these polymers.

The block copolymer according to the invention preferably possesses an amorphous elastomer polymer chain (A), the elastomer preferably having a glass transition temperature below 15° C. The polymer chain can for instance be chosen from the group formed by polyisoprene, polybutadiene, polybutadiene-styrene copolymers, polyisobutylene, polyisobutylene vinyl ether, polyvinyl methyl ether. More in particular the polymer chain (A) is polyiso-butylene or polyisobutylene vinyl ether.

The polymer chain (B), which, unlike polymer chain (A), need not be an amorphous elastomer polymer, is preferably chosen from the chains of polystyrene, poly-α-methylstyrene, polyvinyl furan, polyvinyl carbazole, polyethers, for instance polytetrahydrofuran and poly-1,3-dioxolane, polyesters, for instance polycaprolactone, polyethers and polyacetals.

More in particular the polymer chain (B) will be composed of chains of polystyrene or poly-α-methylstyrene.

A second preferred embodiment of the block copolymer, A-b-B, according to the invention is obtained by a combination of cationic and anionic polymerization. Polymer chain A is composed of monomers that can be polymerized cationically, as indicated in the above, and in this preferred embodiment is preferably terminated by a furan derivative according to formula (I), where $R_1$ and $R_2$ are hydrogen atoms, $n = 0–10$, $m = 1$, $R_3$ is an —NCO—group, $X = 0$ and $p = 1$. The furan derivative meant in the preferred embodiment is an isocyanate-containing derivative according to formula (Ia).

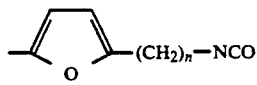

After cationic polymerization with polymer chain A the polymer is preferably subjected to further anionic polymerization with lactam group-containing monomers. This yields a block copolymer chain of a polymer chain A and a polyamide.

The preparation of the block copolymer according to the invention preferably takes place in one single reactor. The monomer of polymer chain (A) is passed, with a solvent, for instance methylene chloride together with 0.1–4 mol %, preferably 0.5–2 mol %, of the furan derivative, into a reactor.

A Lewis acid is added as catalyst. Preferably suitable is an alkyl aluminium, for instance trimethyl aluminium, triethyl aluminium, diethyl aluminium hydride, or an alkyl aluminium halide, for instance dimethyl aluminium chloride, diethyl aluminium iodide, ethyl aluminium dichloride. More in particular the catalyst will be ethyl aluminium dichloride. The reaction temperature is between −30° C. and 0° C., preferably between −25° C. and −10° C.

After a period of time (20 to 300 min.), the remaining residual monomer is removed from the reaction mixture, without the catalyst being deactivated. Subsequently the monomer of polymer chain (B) is added, if desired simultaneously with a fresh amount of catalyst. After e.g. 20–60 min. the reaction is stopped by the addition of, for instance, isopropanol.

Possibly some degree of homopolymerization has taken place beside the prepared block copolymer. By careful extraction the block copolymer and the homopolymer formed can, if desired, be separated. Such a selective extraction method is described in U.S. Pat. No. 3,994,993.

The block copolymers thus obtained are eminently suitable for addition as compatibilizer to mixtures of, for instance, thermoplastics. However, they can also be processed into an end product.

The invention will be elucidated by means of the following examples, without, however, being restricted thereto.

EXAMPLES

A. Preparation of 2,5 (bis-2-furanyl methylene) furan (bFMF) (V) and difuryl methane (DMF) (VI)

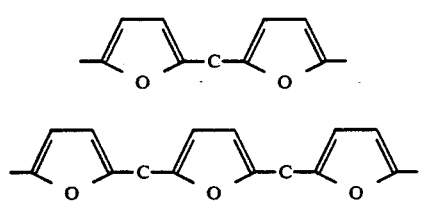

A 50 ml flask was charged with:
100 ml (1.37 mol) furan and
120 ml (1.37 mol) furfuryl alcohol.

The temperature in the flask was 0°–5° C., and this temperature was obtained by means of an ice bath around the flask. Dropwise, 20 ml hydrochloric acid (37%) was added to the solution. After the addition the ice bath was removed and the solution was stirred for 4 hours.

After 4 hours the solution was neutralized with sodium carbonate and washed with water. The reaction mixture was decanted, upon which the solvent was evaporated from the organic layer.

Vacuum distillation was applied to separate bFMF and DMF.

The DMF boiling temperature was (15 mm Hg) 80° C., and that of bFMF (15 mm Hg) 150° C.

B. Preparation of difuryl propane (DFP) (VII) and 2,5 bis (2 furanyl isopropyl) furan (bFPF) (VIII)

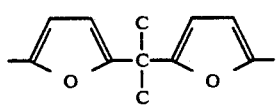

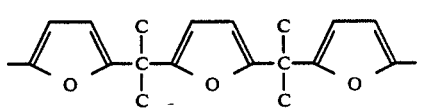

The preparation took place in the same way as under A, only now use was made of:
200 ml (2.75 mol) furan and
100 ml (1.4 mol) acetone.
Tb DFP (15 mm Hg) = 84° C.
Tb bFPF (15 mm Hg) = 156° C.

EXAMPLES 1–7

Preparation of polyisobutylene-b-polystyrene block copolymer

A 1000 ml flask was charged with 500 ml methylene chloride (CH$_2$CL$_2$) as solvent, after which 20 ml (215 mmol) isobutylene was added together with 1 mol % furan derivative and an amount of ethyl aluminium dichloride (EtAlCl$_2$) as catalyst. After 30 minutes the isobutene that had not yet polymerized was removed and styrene, optionally with extra catalyst, was added (25 ml, 215 mmol). After 30 minutes the reaction was terminated by addition of a large amount of isopropanol and the reaction product obtained was extracted. After extraction, vapour pressure osmometry was applied to determine the molecular weight (Mn) of the block copolymer obtained (see Table 1).

TABLE 1

| Example | EtAlCl$_2$ derivative | Furan | Reaction temp. | Yield | Mn |
|---|---|---|---|---|---|
| 1 | 2 × 10 ml | bFMF | −20° C. | 80% | 1600 |
| 2 | 1 × 20 ml | DFM | −20° C. | 89% | 3500 |
| 3 | 2 × 20 ml | DFM | −20° C. | 91% | 2900 |
| 4 | 1 × 15 ml | DFP | −25° C. | 92% | n.a. |
| 5 | 1 × 15 ml | bFPF | −25° C. | 95% | n.a. |
| 6 | 2 × 10 ml | bFM | −20° C. | 85% | 2000 |
| 7 | 2 × 15 ml | bFM | −25° C. | 80% | 1700 |

Yield calculated on the basis of the amounts of isobutylene and styrene added.

EXAMPLE 8

Preparation of furfuryl isocyanate (Ia)

As starting material for the preparation of furfuryl isocyanate use was made of furfuryl amide chloride. This substance was obtained by addition of hydrochloric acid to furfuryl amide and precipitation in acetone.

12 g 2-furfuryl amide chloride was dissolved in 100 ml o-dichlorobenzene. Phosgene was passed through the solution at a temperature of 5° C. The solution was then slowly heated to 140° C. and kept at this temperature for 20 minutes.

After filtration a dark solution was obtained. Its boiling point was 90° C.

Polyisobutylene-b-polyamide block copolymer

As in example 1, use being made of the following substances:
20 ml (215 mmol) isobutylene;
1 mol % furfuryl isocyanate;
15 ml EtAlCl$_2$;
reaction temperature −20° C.
After 30 minutes 215 mmol caprolactam was added.
Yield 80%; Mn=4500.

EXAMPLE 9

α-methyl styrene-DMF-isobutyl vinyl ether block copolymer

Preparation as in example 1, with the following substances:
50 ml alpha-methyl styrene;
0.5 ml 2,2′-difuryl methane (DMF, VI);
20 ml EtAlCl2;
reaction temperature −20° C.
After 30 minutes 50 ml isobutyl vinyl ether was added.
Yield 70%; Mn=4500.

EXAMPLE 10

Tetrahydrofuran-DMF-isobutyl vinyl ether block copolymer

As example 8, with the following substances:
40 ml tetrahydrofuran;
4.7 ml 2,2′-difuryl propanol (DFP, VII);
4.4 g Et$_3$OSbCl$_6$;
reaction temperature −10° C.
After 3 hours 40 ml isobutyl vinyl ether was added. After 30 minutes the reaction was stopped by addition of isopropanol.
Yield: 57%.

EXAMPLE 11

Styrene-DFE-dioxolane block copolymer

As example 9, with the following substances:
80 ml methylene chloride;
40 ml dioxolane;
5 ml 2,2′-difuryl ethanol (DFE);
2.3 g SbCl$_5$;
reaction temperature −10° C.; reaction time 3 hours.
After 3 hours 50 ml styrene was added.
Yield: 64%; M−n=3100.

We claim:
1. Block copolymer according to the formula A-b-B, wherein A and B are not the same, obtained by cationic polymerization of at least one polymer chain to binding group (b), wherein the binding group (b), positioned between polymer chains (A) and (B), is a furan derivative according to formula I:

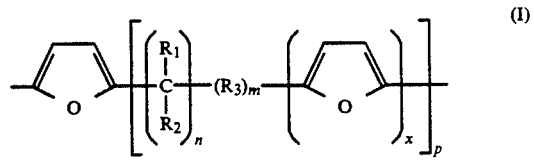

where n=0–10; m=0 or 1; x=0, 1 or 2; p=0, 1 or 2; $R_1$=a hydrogen atom or an alkyl group with 1–4 carbon atoms; $R_2$=a hydrogen atom or an alkyl group with 1–4 carbon atoms; $R_3$=—NCO— or —COO—; and polymer chain (A) is selected from the group consisting of polyisobutylene, polyisopropylene, polystyrenes, polyvinyl carbazoles, polyvinyl ethers, polyvinyl furans, polyesters, polyethers, and polyacetals, and polymer chain (B) is selected from the group consisting of polyisobutylene, polyisopropylene, polystyrenes, poly-α-methylstyrene, polyvinyl carbazoles, polyvinyl ethers, polyvinyl furans, polyesters, polyethers, polyacetals, and polymers composed of lactam-group containing monomers.

2. Block copolymer according to claim 1, characterized in that the block copolymer contains 0.1–4 mol % of the furan derivative.

3. Block copolymer according to claim 1, wherein n=1 or 2 and p=1 or 2.

4. Block copolymer according to claim 1, characterized in that $R_1$ and $R_2$ are a hydrogen or a methyl group.

5. Block copolymer according to claim 1, characterized in that polymer chain (A) is an amorphous elastomer and is chosen from the group: polyisobutylene and polyisobutylene vinyl ether.

6. Block copolymer according to claim 1, characterized in that $R_1$, $R_2$ are a hydrogen, p=1 or 2, m=1, x=0 and $R_3$ is a —COO— or NCO— group.

7. Block copolymer according to claim 6, characterized in that $R_3$ is an —NCO— group.

8. Block copolymer according to claim 6, characterized in that polymer chain B is composed of Lactam-containing monomers.

9. Process for the preparation of a block copolymer according to claim 1, characterized in that 0.1–4 mol % of a furan derivative according to formula (I) is fed, simultaneously with monomers of polymer chain (A) and a catalyst, to a reactor at a temperature of −30°–0° C., the residual monomers of (A) being removed after a reaction time of 20–300 min, following which the monomers of polymer chain (B) are added to the same reactor.

10. Block copolymer according to claim 1, wherein polymer chain (A) is an elastomer having a glass transition temperature below 15 degrees Celsius.

11. Block copolymer according to claim 1, wherein polymer chain (A) is selected from the group consisting of polyisobutylene, polyisopropylene, polystyrenes, polyvinyl carbazoles, polyvinyl ethers, polyvinyl furans, polyesters, polyethers, and polyacetals, and polymer chain (B) is selected from the group consisting of polystyrenes, poly-α-methylstyrene, polyvinyl carbazoles, polyvinyl ethers, polyvinyl furans, polyesters, polyethers, polyacetals, and polymers composed of lactam-group containing monomers.

12. Block copolymer according to claim 1, wherein polymer chain (B) the polymers composed of lactam-group containing monomers are polyamides.

* * * * *